US012700665B2

(12) United States Patent
Taylor et al.

(10) Patent No.: US 12,700,665 B2
(45) Date of Patent: Aug. 4, 2026

(54) SPACE ANTENNA HAVING DEPLOYABLE, STEERABLE ANTENNAS AND RELATED METHODS

(71) Applicant: EAGLE TECHNOLOGY, LLC, Melbourne, FL (US)

(72) Inventors: Robert M. Taylor, Rockledge, FL (US); Justin J. Luther, Melbourne, FL (US); Stephen Jenkins, Palm Bay, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 261 days.

(21) Appl. No.: 18/408,721

(22) Filed: Jan. 10, 2024

(65) Prior Publication Data

US 2025/0226573 A1 Jul. 10, 2025

(51) Int. Cl.

| | |
|---|---|
| ***G01S 1/28*** | (2006.01) |
| ***H01Q 1/10*** | (2006.01) |
| ***H01Q 1/28*** | (2006.01) |
| ***H01Q 3/02*** | (2006.01) |
| ***H01Q 3/30*** | (2006.01) |

(52) U.S. Cl.

CPC ............... *H01Q 1/288* (2013.01); *H01Q 1/10* (2013.01); *H01Q 3/02* (2013.01); *H01Q 3/30* (2013.01)

(58) Field of Classification Search

CPC ........ H01Q 1/10; H01Q 1/1235; H01Q 1/288; H01Q 15/161; H01Q 19/17; H01Q 3/02; H01Q 3/08; H01Q 3/26; H01Q 3/30

See application file for complete search history.

(56) References Cited

U.S. PATENT DOCUMENTS

| | | | | |
|---|---|---|---|---|
| 5,527,001 | A * | 6/1996 | Stuart | B64G 1/2224 244/172.6 |
| 6,268,835 | B1 | 7/2001 | Toland et al. | |
| 6,366,255 | B1 | 4/2002 | Chiang | |
| 6,448,940 | B1 | 9/2002 | Chiang | |
| 7,602,349 | B2 | 10/2009 | Hentosh et al. | |
| 9,608,333 | B1 | 3/2017 | Toledo et al. | |
| 11,114,750 | B1 | 9/2021 | Turner et al. | |
| 11,183,768 | B1 * | 11/2021 | Taylor | H01Q 19/175 |
| 2021/0091479 | A1 | 3/2021 | Henderson et al. | |

FOREIGN PATENT DOCUMENTS

EP 3945635 2/2022

OTHER PUBLICATIONS

U.S. Appl. No. 18/155,797, filed Jan. 18, 2023 Inventors: Robert M. Taylor et al.

* cited by examiner

*Primary Examiner* — Timothy A Brainard

(74) *Attorney, Agent, or Firm* — ALLEN, DYER, DOPPELT, + GILCHRIST, P.A. Attorneys at Law

(57) ABSTRACT

A deployable space antenna may include a housing and a first telescoping boom and a second telescoping boom extendable from the housing in opposite directions from a stowed position to a deployed position. Each of the first and second telescoping booms may include telescoping boom segments. Each of a plurality of deployable, steerable antennas is carried by respective telescoping boom segment and movable between a stowed position and a deployed position. An antenna controller is configured to steer the deployable, steerable antennas.

24 Claims, 9 Drawing Sheets

SPACE ANTENNA HAVING DEPLOYABLE, STEERABLE ANTENNAS AND RELATED METHODS

FIELD OF THE INVENTION

The present invention relates to the field of antennas, and, more particularly, to steerable space antennas and related methods.

BACKGROUND OF THE INVENTION

Satellites carry many instruments and at least one antenna. Due to volume constraints in a launch vehicle, the antenna is typically deployed from its stowed position during launch into a large aperture for operation on the satellite after reaching its desired orbit. Depending on the types of instruments in a satellite, the configuration of any satellite antennas carried by the satellite may vary considerably. Even though the antenna configurations vary among different satellites, there is still often the common desire for a large coherent aperture, which may be in direct conflict with the desire for lower mass and stowed volume during launch of the satellite. For example, satellite radar antennas may use an aperture that is long in one direction, but narrow in the other direction to optimize the shape and distribution of the antenna beam. This type of antenna usually uses some type of beam scanning to increase coverage from orbit.

The Innovative Space-Based Radar Antenna Technology (ISAT) program has an antenna configuration that optimizes its radar aperture using a 300 meter long by 10 meter wide trough reflector operating from mid-earth orbit (MEO). This very large antenna includes a deployable truss that carries phased array elements, for example, an electronically scanned array (ESA) cooperating with a phased array RF reflector surface positioned on the truss. This large antenna configuration, however, may be inadequate for smaller radar satellites or similar satellites operating at low earth orbit (LEO). These satellites may require a deployable antenna that is more simple than the ISAT antenna, not only to reduce the cost of the satellite, but also to reduce the cost of any satellite constellation formed from a number of such orbiting satellites.

There have been proposals to operate together multiple smaller orbiting satellites in a satellite constellation in an attempt to form a larger satellite aperture, but the inherent complexity to establish the positioning and pointing accuracy of each separate antenna to operate with other satellites in the constellation is challenging. There is, therefore, still a need to integrate the efficiency achieved by small satellites while simplifying RF beam integration without having multiple orbiting satellites that are combined together to form one aperture. It is desirable to maintain one orbiting satellite instead of multiple orbiting satellites operating as a single aperture.

Many satellite radar systems, such as ISAT, use large, rectangular phased arrays that are longer in one dimension than the other and allow nearly instantaneous scanning of the beam over a wide angle in both azimuth and elevation. However, these phased array antennas are heavy and expensive. The High Efficiency Sensitivity Accuracy (HESA) antenna was designed as a lower cost alternative to these phased array antennas, such as ISAT. The HESA antenna is like the ISAT antenna and employs a trough style reflector, but the HESA antenna was simplified with a pair of wings, each deployed by a single telescoping boom. A series of ribs were each attached to a section of the telescoping boom, forming the trough as the boom is extended. The phased array was folded between each pair of ribs, and therefore, also deployed by the telescoping boom. However, the HESA antenna still used a heavy and expensive phased array system.

Other space antennas, such as for space radar systems, typically use center-fed reflectors to provide gain without the high cost of a large phased array, such as ISAT, a HESA antenna, TecSAR in Israel, and DSO from Singapore. There is still a need, however, to reduce the cost and mass of large complex phased arrays and similar antennas and reduce their stowed volume compared to HESA and similar antennas for combined aperture performance.

SUMMARY OF THE INVENTION

In general, a deployable space antenna may comprise a housing and a first telescoping boom and a second telescoping boom extendable from the housing in opposite directions from a stowed position to a deployed position. Each of the first and second telescoping booms may comprise a plurality of telescoping boom segments that carry a plurality of deployable, steerable antennas. Each deployable, steerable antenna may be carried by a respective telescoping boom segment and movable between a stowed position and a deployed position. An antenna controller may be configured to steer the plurality of deployable, steerable antennas.

Each deployable, steerable antenna may comprise a reflector and a feed associated therewith. At least one actuator may be configured to mechanically steer the deployable, steerable antenna. The feed may comprise a phased array antenna feed configured to electronically steer the deployable, steerable antenna.

In other embodiments, each deployable, steerable antenna may comprise a phased array antenna. The phased array antenna may, in turn, comprise a substrate and a plurality of antenna elements carried by the substrate.

Each deployable, steerable antenna may comprise an extendable support carried by a respective telescoping boom segment, and an extendable hoop surrounding the extendable support. Each deployable, steerable antenna may comprise a front cord arrangement coupled to the extendable hoop and defining a curved shape in a deployed position, and a reflective layer carried by the front cord arrangement. Each deployable, steerable antenna may also comprise a rear cord arrangement behind the front cord arrangement and coupled between the extendable hoop and the extendable support, and may comprise a plurality of tie cords extending between the front cord arrangement and the rear cord arrangement.

In some embodiments, adjacent ones of the plurality of steerable, deployable antennas may be arranged in a staggered relation defining overlapping antenna patterns.

Another aspect is directed to a method of making a deployable space antenna. The method may comprise coupling a first telescoping boom and a second telescoping boom to be extendable from a housing in opposite directions from a stowed position to a deployed position. Each of the first and second telescoping booms may comprise a plurality of telescoping boom segments. The method may include coupling each of a plurality of deployable, steerable antennas to a respective telescoping boom segment that is movable between a stowed position and a deployed position. The method may also include coupling an antenna controller to steer the plurality of deployable, steerable antennas.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

Figure 1:
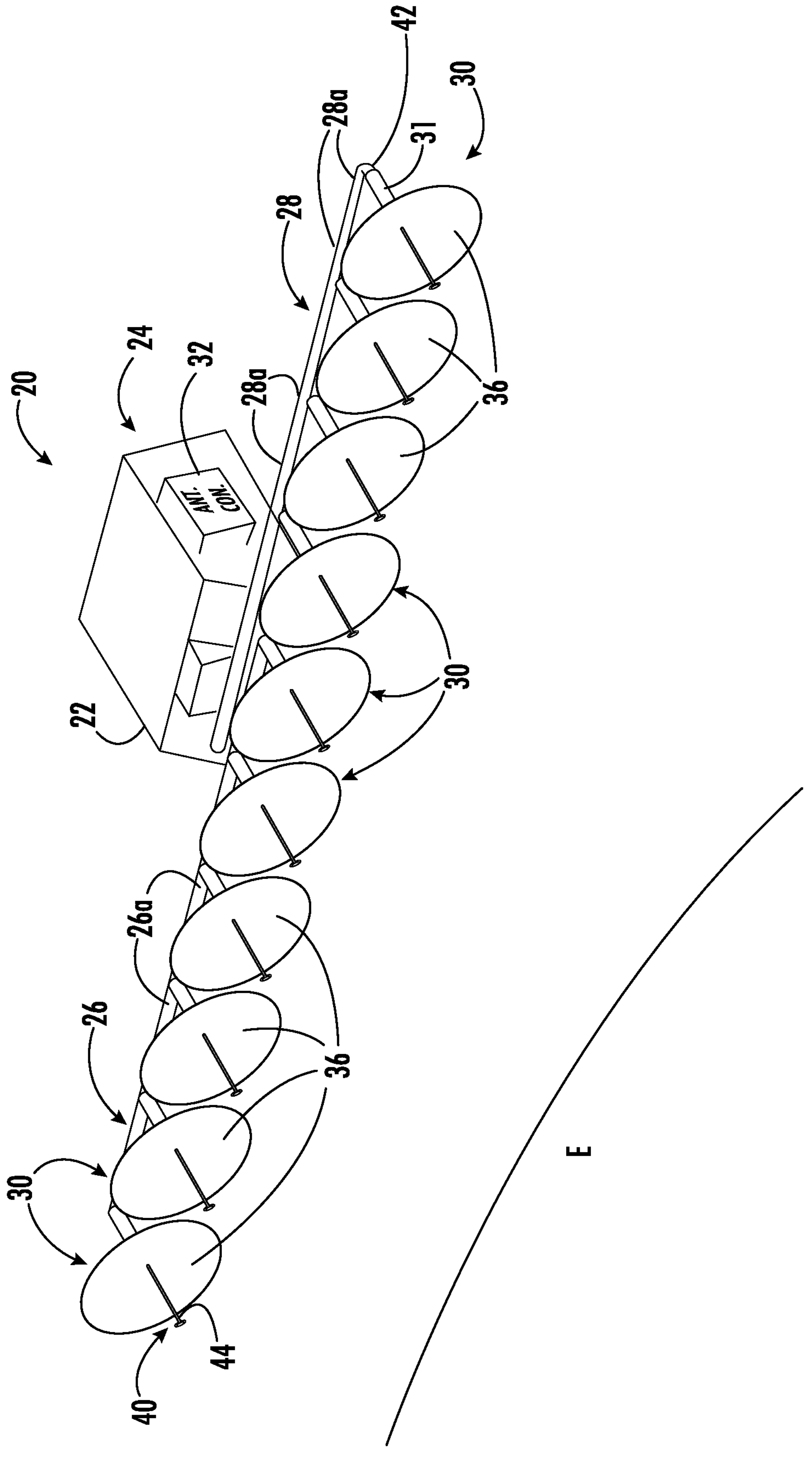
FIG. 1 is a perspective view of the space antenna mounted on a satellite showing the telescoping booms and steerable antennas in a deployed position in accordance with the invention.
Figure 2:
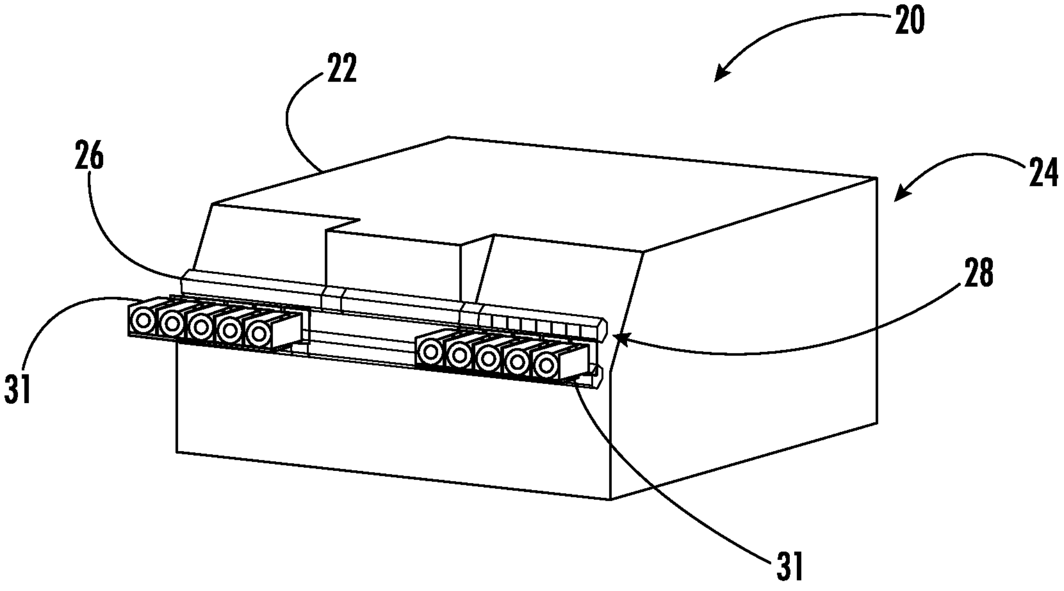
FIG. 2 is a perspective view of the space antenna of FIG. 1 showing the telescoping booms and steerable antennas in a stowed position.

Referring now to FIGS. 1-4, a deployable space antenna is illustrated generally at 20, with FIG. 1 showing the space antenna in a deployed position, and FIG. 2 showing the space antenna in a stowed position. The space antenna 20 includes a housing 22, which in this example is formed as the housing of a satellite 24 that is shown orbiting Earth (E), such as in a low Earth orbit (LEO) for some small satellites. Other satellite orbiting altitudes may be established depending on satellite functions and design, including mid-Earth orbit (MEO) and geostationary orbits.

Figure 3:
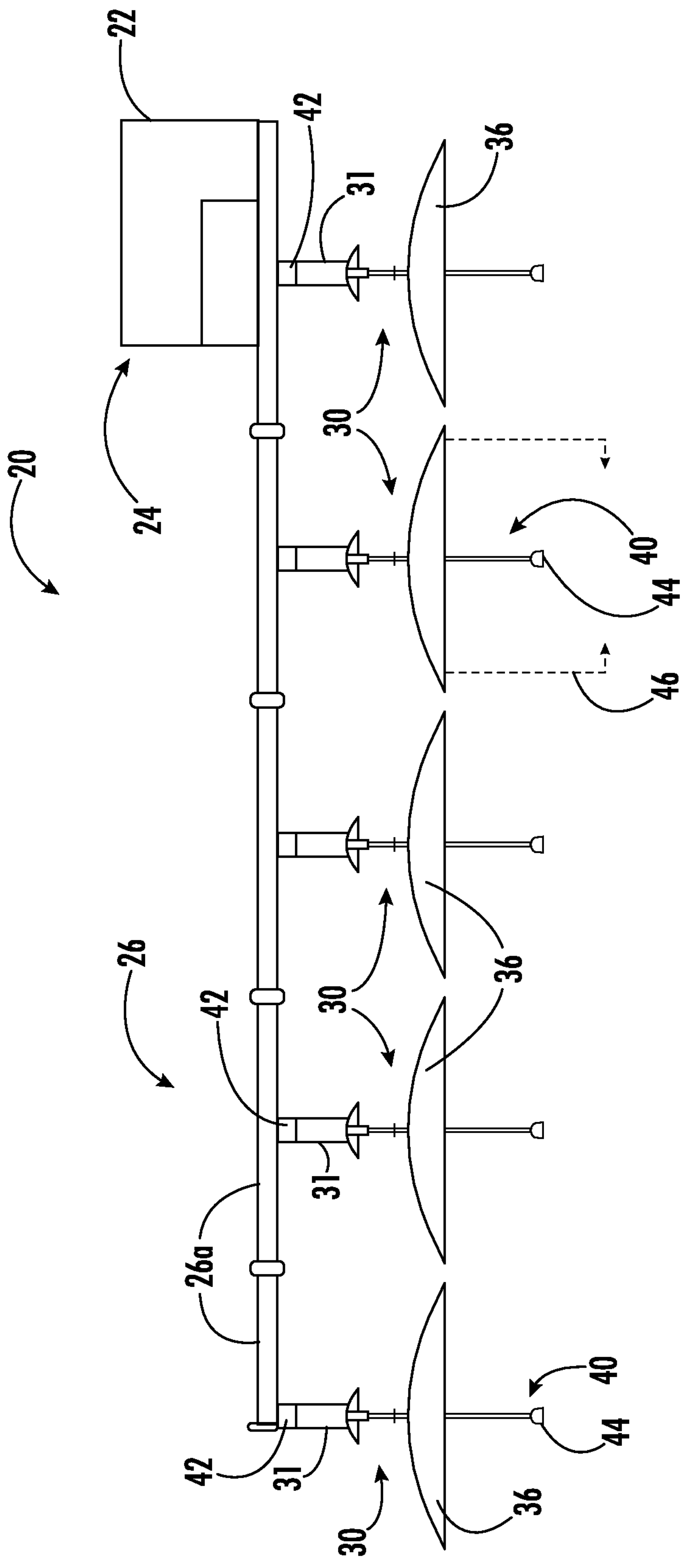
FIG. 3 is a top plan view of a deployed telescoping boom and its steerable antennas as shown in FIG. 1.
Figure 4:
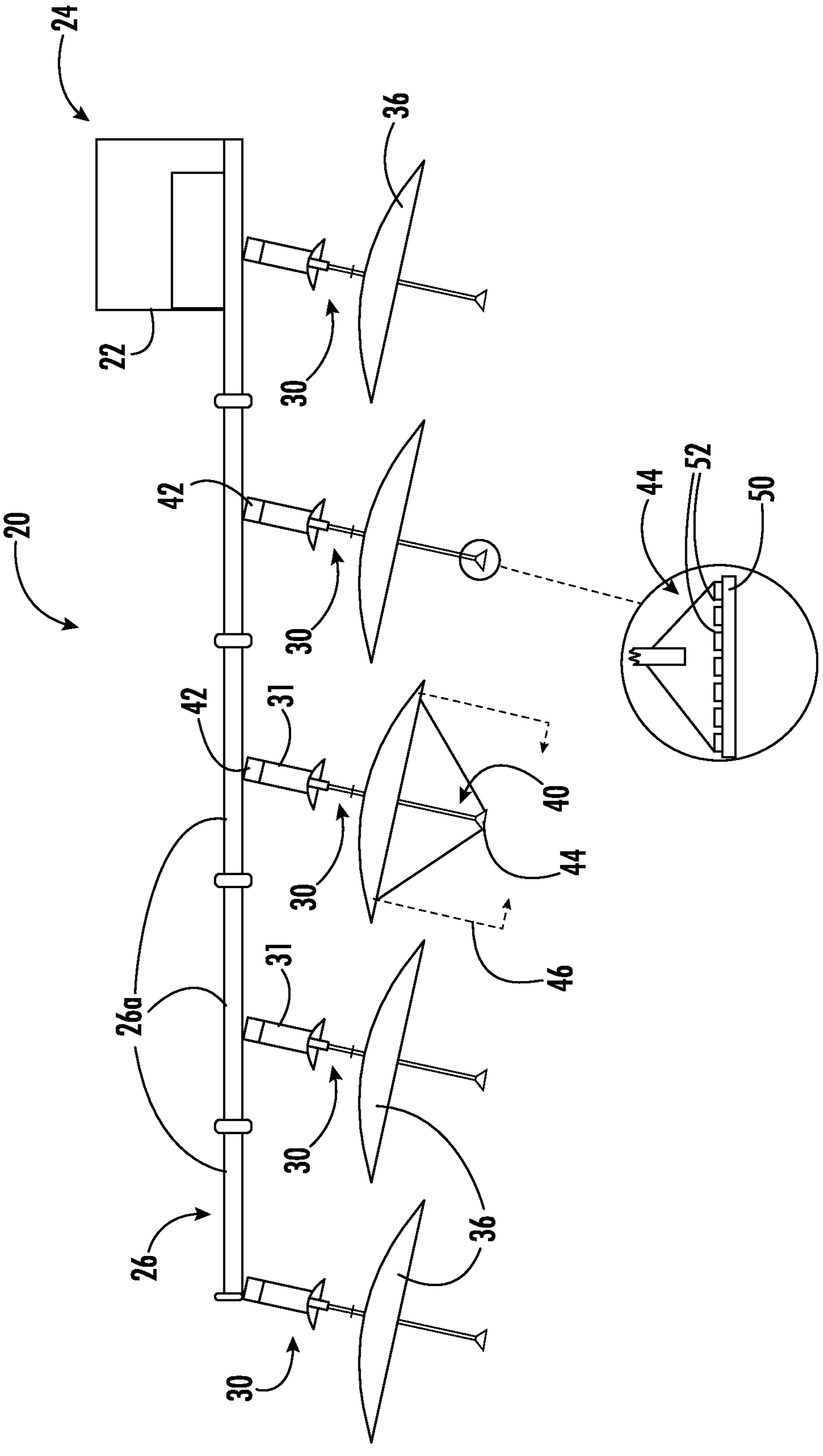
FIG. 4 is another top plan view of a deployed telescoping boom and its steerable antennas of FIG. 3 having their apertures slewed via an actuator.

A first telescoping boom 26 and a second telescoping boom 28 are extendable from the housing 22 in opposite directions from a stowed position (FIG. 2) to the deployed position (FIG. 1). Each of the first and second telescoping booms 26, 28 include a plurality of telescoping boom segments **26*a*, 28*a*. A plurality of deployable, steerable antennas 30 are carried by the first and second telescoping booms 26, 28. Each deployable, steerable antenna 30 is carried by a respective telescoping boom segment 26*a*, 28*a* and movable between a stowed position (FIG. 2), where each steerable antenna 30 is stored in an antenna housing 31, and its deployed position (FIGS. 1, 3 and 4). An antenna controller 32 in this example is mounted within the housing 22 of the satellite 24 and configured to steer the plurality of deployable, steerable antennas 30**.

The satellite 24 may include other components not illustrated in detail, such as, for example, a solar or nuclear power system, an attitude control circuit, a gyroscope, a transceiver operative with the space antenna 20, a payload circuit that collects data from an installed camera, a particle detector or other sensor, and a propulsion system to adjust trajectory.

Each deployable, steerable antenna 30 includes a reflector 36 and a feed 40 associated therewith. At least one actuator 42 may be associated with a respective deployable, steerable antenna 30 and configured to mechanically steer the deployable, steerable antenna. The at least one actuator 42 in an example may be an antenna pointing gimbal supported by a respective telescoping boom segment **26*a*, 28*b* that points the antenna bore to its desired target, and if the satellite 24** is used for RF communications, tracks to maintain an RF link to the satellite.

The actuator 42 may be formed as a 2-axis gimbal where antenna 30 motion relative to the satellite 24 may be produced in either an elevation-over-azimuth or a cross-axis format. Various rotary joints may be integrated with an actuator 42 as a gimbal, for example. In the example of FIG. 4, the actuator 42 as a gimbal has slewed the apertures of each steerable antenna 30 as compared to the example in FIG. 3 where the apertures for each steerable antenna 30 are nominally pointed.

In an example, the antenna feed 40 may be formed as a phased array antenna feed 44 configured to electronically steer the deployable, steerable antenna as shown in FIGS. 3 and 4, showing the beam scan 46 where the beam scan is slewed in FIG. 4. Each deployable, steerable antenna 30 may be array fed, and each steerable antenna may form a phased array antenna that includes the phased array antenna feed 44 as in the enlarged phased array antenna feed example shown in the diagrammatic circle of FIG. 4. In that example, the phased array antenna feed 44 includes a substrate 50 and plurality of phased array antenna elements 52 carried by the substrate. It is also possible for the reflector 36 to carry the substrate 50 and antenna elements 52. It is also possible that each deployable, steerable antenna 30 includes a substrate 50 carrying a plurality of antenna elements 52.

Figure 5:
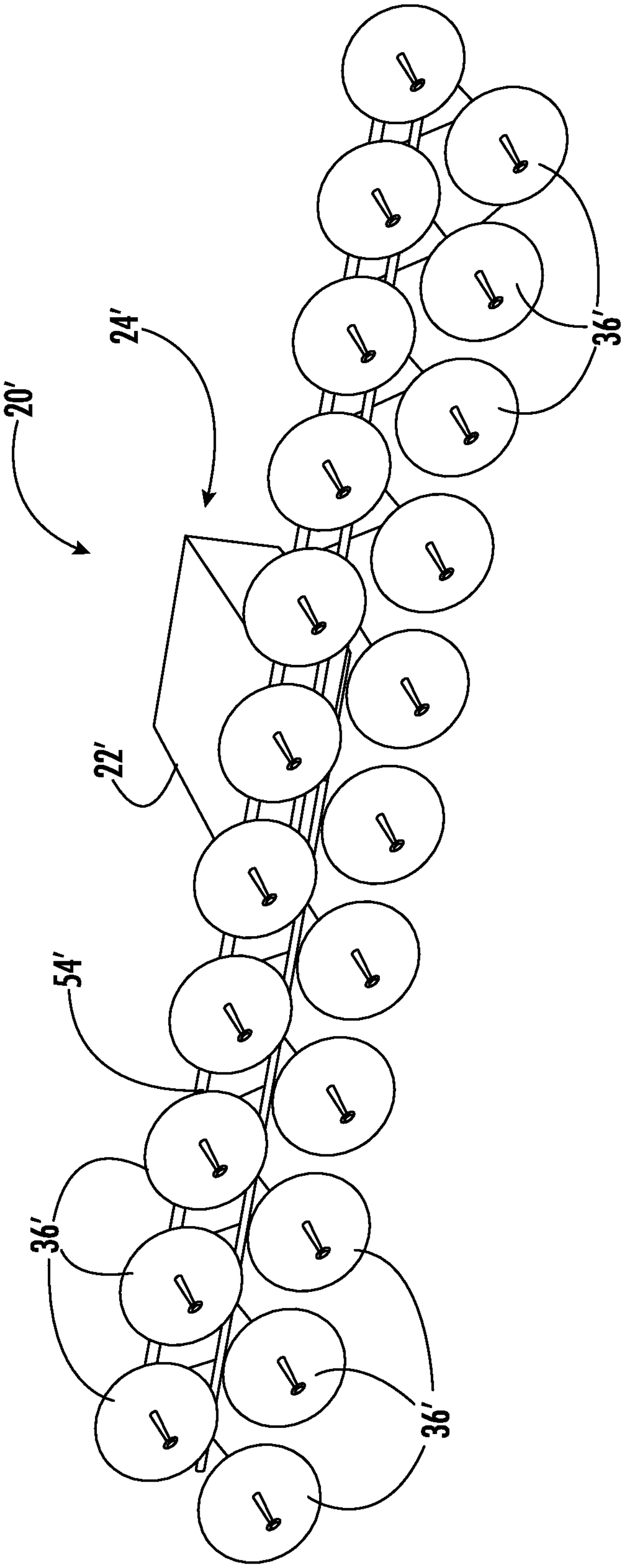
FIG. 5 is a perspective view of another embodiment of a space antenna showing the steerable antennas arranged in a staggered relation defining overlapping antenna patterns.
Figure 6:
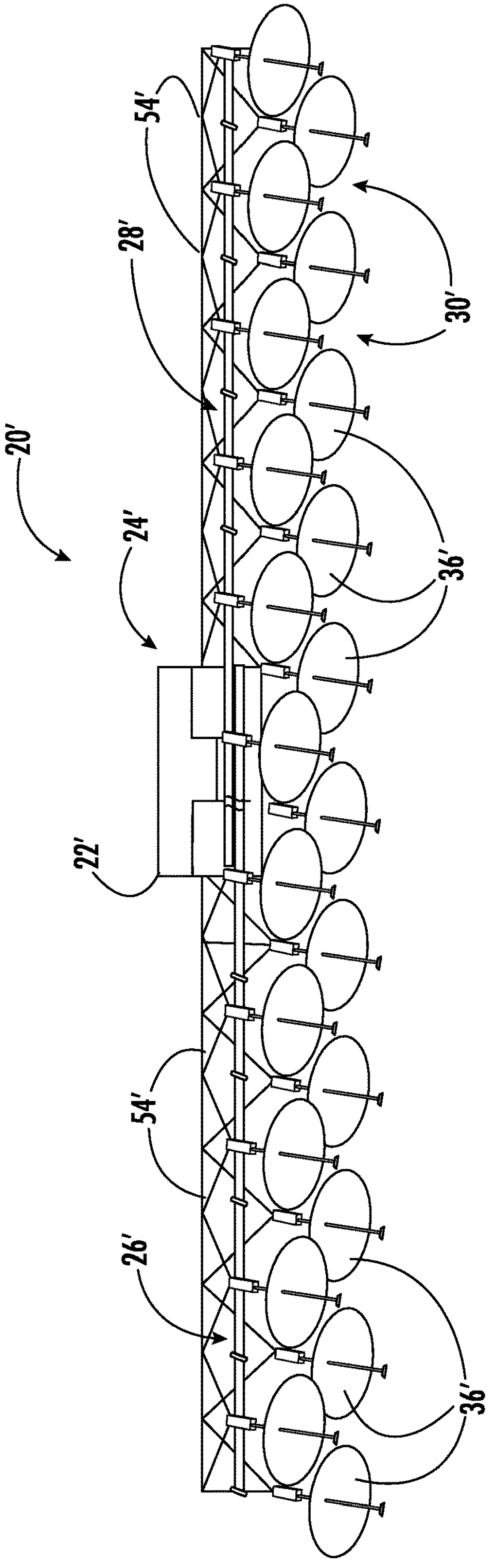
FIG. 6 is another perspective view of the space antenna of FIG. 5.
Figure 7:
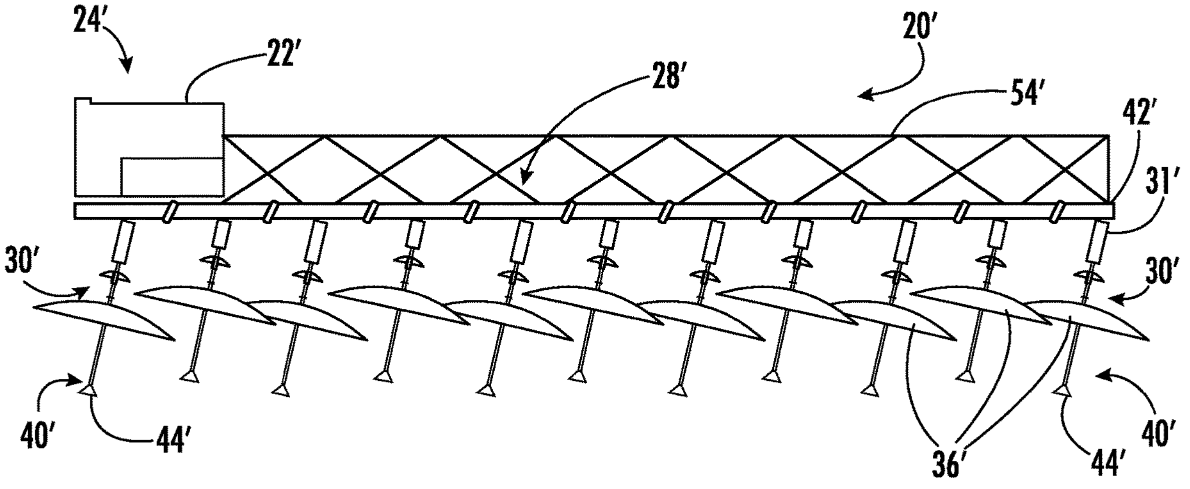
FIG. 7 is a top plan view of a deployed telescoping boom and its steerable antennas as shown in FIGS. 5 and 6.
Figure 8:
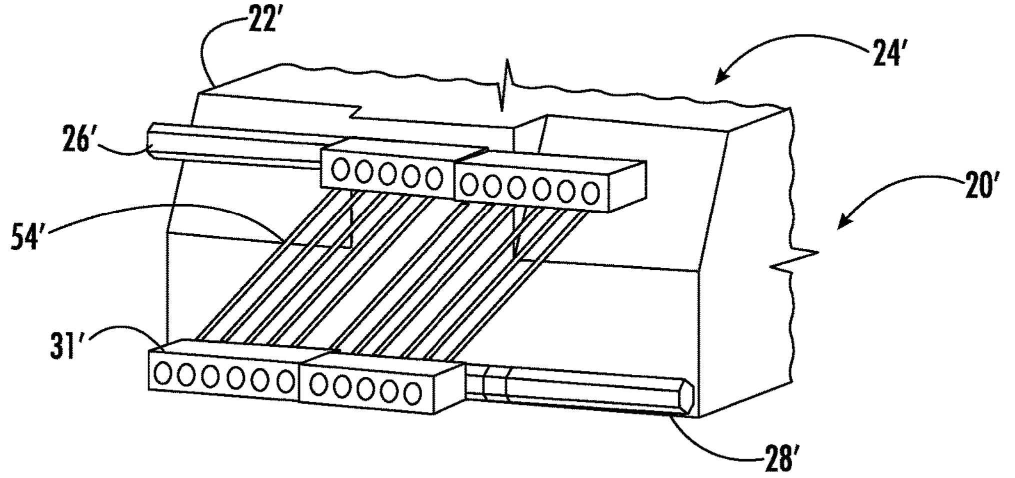
FIG. 8 is a perspective view of the space antenna of FIGS. 5 and 6 showing the telescoping booms and steerable antennas in a stowed position.

In the example of FIGS. 5-7, another embodiment of the space antenna 20' is shown where adjacent ones of the plurality of steerable, deployable antennas 30' are arranged in a staggered relation defining overlapping antenna patterns. The first and second telescoping booms 26', 28' and plurality of deployable, steerable antennas 30' are shown in a deployed position in FIGS. 5, 6 and 7, and in a stowed position in FIG. 8. In the example of FIGS. 5-8, two steerable antennas 30' are rigidly attached to a beam that is attached to a segment of the telescoping boom **26*a*' or 28*a*'. In the example of FIGS. 5-8, a cord network 54' may connect to the first and second telescoping booms 26', 28' and the plurality of beams that connect the deployable, steerable antennas 30'** to form a truss in the deployed state that will increase the stiffness of the deployed structure.

Figure 9:
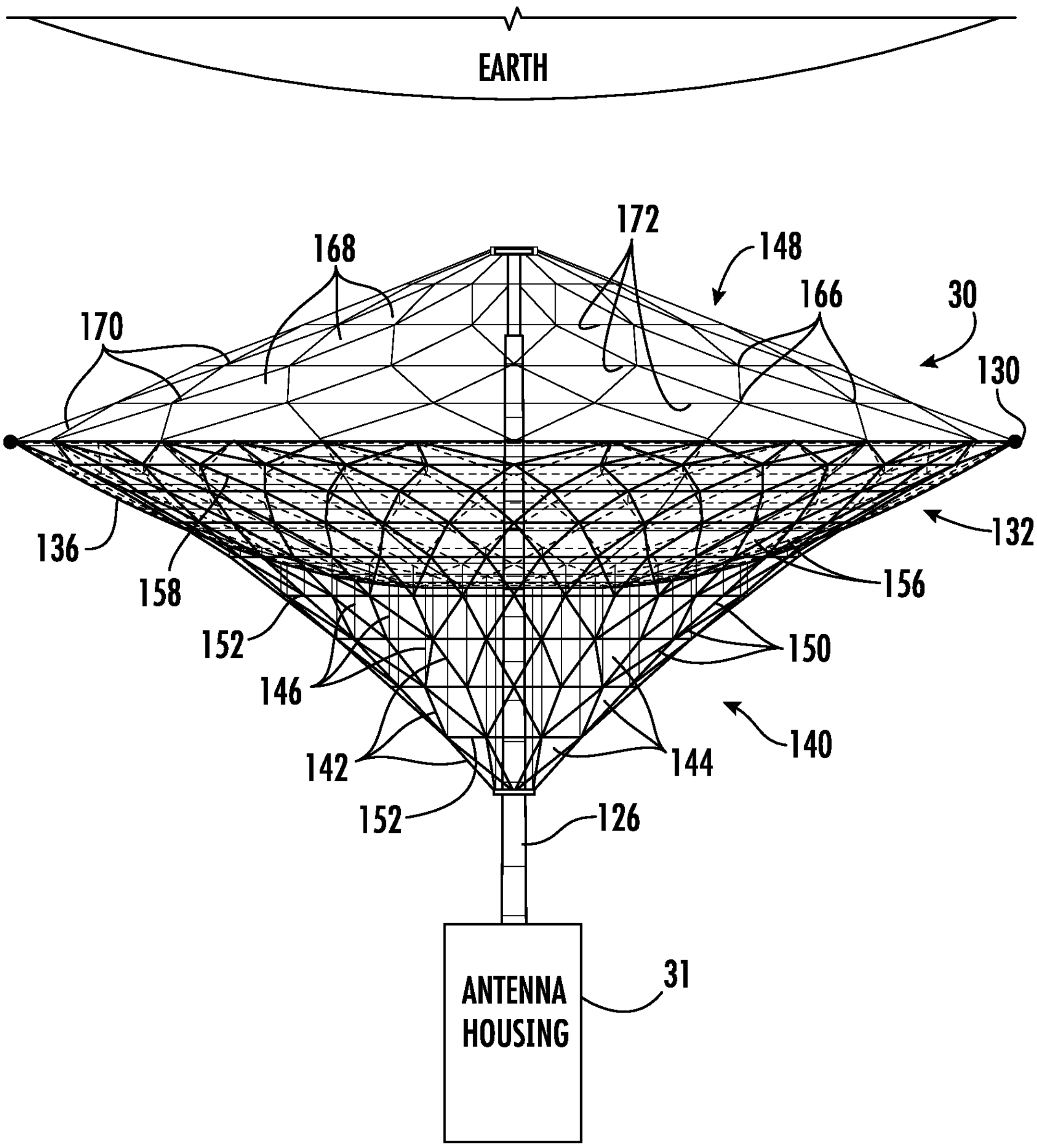
FIG. 9 is a side elevation view of an example steerable antenna as a hoop antenna in a deployed position.

An example steerable antenna 30 may be formed as a High Compaction Ratio (HCR) antenna for compact storage. An example of the steerable antenna 30 as a high compact ratio antenna is shown in FIG. 9.

This antenna 30 includes an extendable support 126 that corresponds in an example to the antenna feed 40 shown in previous FIGS. 1, 3 and 4 and movable between stored and deployed positions. In the stored position, the extendable support 126 is received within the antenna housing 31 together with other components of the antenna and carried by a respective telescoping boom 26, 28. The extendable support 126 is extendable outward and vertically up into the extended position as shown in FIG. 9. An extendable hoop

130 surrounds the extendable support 126 and is movable between the stored and deployed positions. The extendable support 126 and extendable hoop 130 may be constructed similar to the structural configuration of the antenna formed as a scalable High Compaction Ratio (HCR) extendable hoop described in U.S. patent application Ser. No. 18/155,797 filed Jan. 18, 2023, and assigned to Eagle Technology, LLC of Melbourne, Florida, the disclosure of which is hereby incorporated by reference in its entirety.

As illustrated, a front cord arrangement 132 is coupled to the extendable hoop 130 and defines a curved parabolic shape in the deployed position. A reflective layer 136 is carried by the front cord arrangement 132. A rear cord arrangement 140 is behind the front cord arrangement 132 and coupled between the extendable hoop 130 and the fixed base of the extendable support 126 at the antenna housing 31. The rear cord arrangement 140 includes a rear plurality of interconnected cords 142 that define a plurality of rear polygons 144. A plurality of tie cords 146 extend between the front cord arrangement 132 and the rear cord arrangement 140. A top cord arrangement 148 is above the reflective layer 136 and is coupled between the extendable hoop 130 and the extendable support 126.

In an example, the plurality of rear polygons 144 may be formed as a plurality of rear triangles as shown by the configuration of the rear polygons. Although rear triangles 144 are illustrated, other shaped polygons, such as rhomboid configurations, may be employed. The rear polygons 144 may also define a plurality of rear non-radial paths between the extendable hoop 130 and the extendable support 126 as shown by the non-linear path indicated at 150. The plurality of rear polygons 144 may also define a plurality of spaced apart rear rings 142 concentric with the extendable support 126. The plurality of tie cords 146 may be parallel to the extendable support 126 to provide tension on the first cord arrangement 132 and help maintain the parabolic shape of the reflective layer 136.

In an example, the front cord arrangement 132 may be formed from a front plurality of interconnected cords 154 that define a plurality of front polygons 156. These front polygons 156 may include a plurality of front triangles. The plurality of front polygons 156 may also define a plurality of front non-radial paths 158 between the extendable hoop 130 and the extendable support 126. A non-radial path 158 is evident by following a front polygon 156 from the outer ring as defined by the extendable hoop 130 along the path defined by front polygons. The front non-radial path 158 for contiguous front polygons 156 may extend between the extendable hoop 130 as the outer perimeter and the extendable support 126 that is centered in and extends through a rectangular opening. In an example, the front polygons 156 may also define a plurality of spaced apart front rings 162 concentric with the extendable support 126.

The top cord arrangement 148 includes a top plurality of interconnected cords 166 that define a plurality of top polygons 168, such as a plurality of top triangles. The plurality of top polygons 168 also may define a plurality of top non-radial paths 170 between the extendable hoop 130 and the extendable support 126. The plurality of top polygons 168 may also define a plurality of spaced apart top rings 172 concentric with the extendable support 126. The phased array antenna feed 44 may be carried by the extendable support 126 at its top free end or tip. The steerable antenna 30 may have a 1 to 5 meter aperture depending on the satellite 24 configuration and function.

The space antenna 20 reduces the cost and mass of large, complex phased arrays by using multiple high gain apertures as the steerable antennas 30 arrayed preferably in a line as shown in the drawing figures, exploiting the passive gain enhancement of integrated parabolic reflectors. The space antenna 20 with its steerable antennas 30 has a reduced, stowed volume as compared to a HESA antenna for similar combined aperture performance, for example. The space antenna 20 may have wide-angled scanning over a broad, operational field-of-view with a faster reappoint time than maneuvering spacecraft. The space antenna 20 may provide visibility from limb-to-limb of Earth from a low Earth orbit (LEO). This configuration permits left/right track scanning without significant scan loss. A narrow-angle beam scan may be achieved when the steerable antennas 30 operate as a phased array to beam scan over a more narrow instantaneous field-of-view.

It is possible that the actuators 42 may be gimbaled with a common mechanism, for example, a synchronization linkage or shaft that may be driven to move all the steerable antennas 30 synchronously in the elevation direction. It is possible to use a folding bar linkage or other mechanism in addition to the first and second telescoping booms 26, 28. The steerable antennas 30' may be stabilized or stiffened by an external cord network 54' between adjacent steerable antennas and their apertures could be staggered in the beam direction as shown in the example FIGS. 5-7 to allow them to overlap and have smaller gaps to reduce grating lobes and have better aperture efficiency. A second row of the steerable antennas 30' may allow gaps to be filled in and enable elevation scans between apertures. The double row of apertures of the steerable antennas 30' may fill in the gaps between the different reflectors 36', maintaining aperture efficiency during a phased array operation. Thus, an array of reflectors 36' may slew in the azimuth and reduce the beam size in azimuth and elevation directions.

The steerable antennas 30 may provide small-angle scanning, digital beam forming for simultaneous beams, and pattern synthesis. It is possible to include other telescoping booms to create a T-shaped distribution of the steerable antennas 30 similar to a Long Baseline Array (LBA) used for RF interferometry on the ground.

Figure 10:
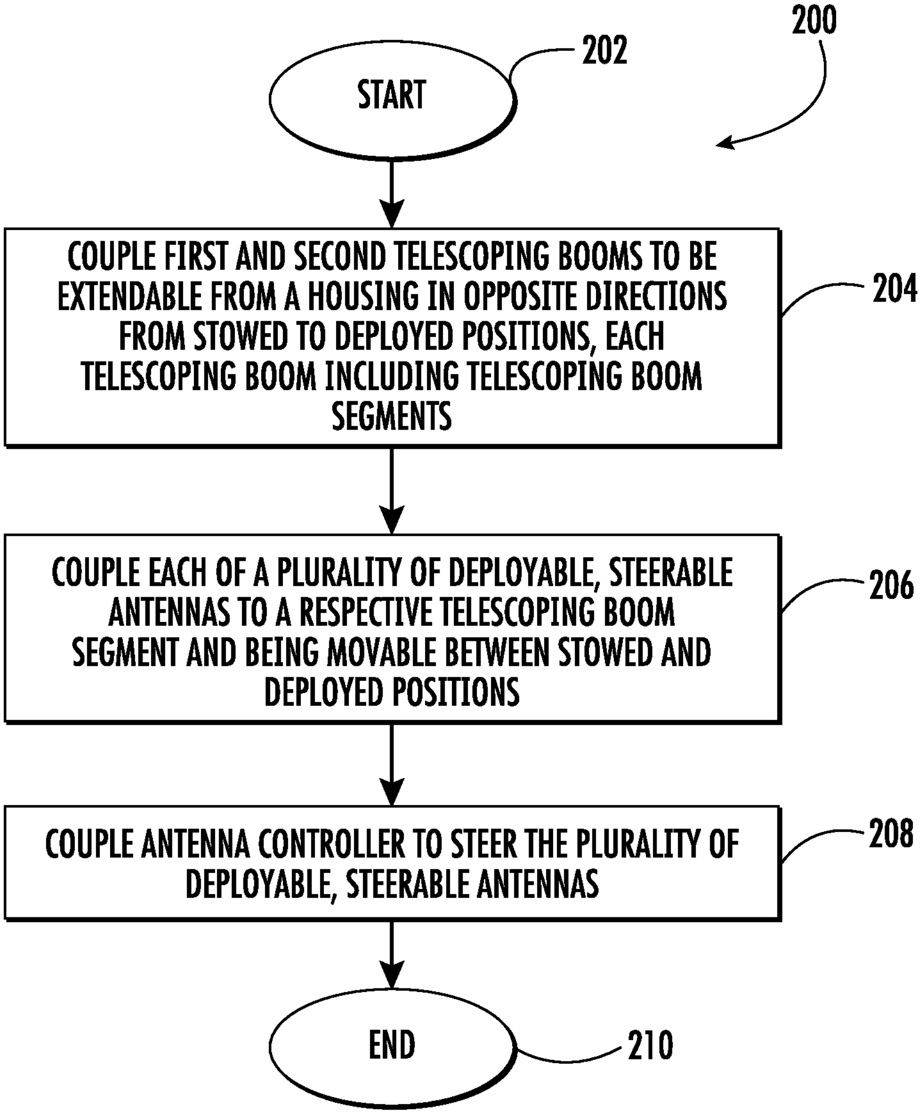
FIG. 10 is a high-level flowchart of a method for making the space antenna.

Referring now to FIG. 10, a high-level flowchart of a method of making the space antenna 20 is illustrated as shown generally at 200. The process starts (Block 202) and a first telescoping beam 26 and a second telescoping beam 28 are coupled to be extendable from the housing 22 in opposite directions from a stowed position to a deployed position with each of the first and second telescoping booms including a plurality of telescoping boom segments **26*a*, 28*a* (Block 204). Each of a plurality of the deployable steerable antennas 30 are coupled to a respective telescoping boom segment 26*a*, 28*a* and are movable between a stowed position and a deployed position (Block 206). The antenna controller 32 is coupled to steer the plurality of deployable, steerable antennas 30 (Block 208). The process ends (Block 210**).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A deployable space antenna comprising:

a housing;

a first telescoping boom and a second telescoping boom extendable from the housing in opposite directions from a stowed position to a deployed position, each of the first and second telescoping booms comprising a plurality of telescoping boom segments;

a plurality of deployable, steerable antennas, each deployable, steerable antenna carried by a respective telescoping boom segment and being movable between a stowed position and a deployed position, each deployable, steerable antenna comprising an individually steerable reflector and a feed associated therewith; and an antenna controller configured to steer the plurality of deployable, steerable antennas.

2. The deployable space antenna of claim 1, comprising at least one actuator configured to mechanically steer the deployable, steerable antenna.

3. The deployable space antenna of claim 1, wherein the feed comprises a phased array antenna feed configured to electronically steer the deployable, steerable antenna.

4. The deployable space antenna of claim 3, wherein the phased array antenna feed comprises a substrate and a plurality of antenna elements carried by the substrate.

5. The deployable space antenna of claim 1, wherein each deployable, steerable antenna comprises:

an extendable support carried by a respective telescoping boom segment; and an extendable hoop surrounding the extendable support.

6. The deployable space antenna of claim 5, wherein each deployable, steerable antenna comprises:

a front cord arrangement coupled to the extendable hoop and defining a curved shape in a deployed position; and a reflective layer carried by the front cord arrangement defining the individually steerable reflector.

7. The deployable space antenna of claim 6, wherein each deployable, steerable antenna comprises:

a rear cord arrangement behind the front cord arrangement and coupled between the extendable hoop and the extendable support; and a plurality of tie cords extending between the front cord arrangement and the rear cord arrangement.

8. The deployable space antenna of claim 1, wherein adjacent ones of the plurality of steerable, deployable antennas are arranged in a staggered relation defining overlapping antenna patterns.

9. A deployable space antenna comprising:

a housing;

a first telescoping boom and a second telescoping boom extendable from the housing in opposite directions from a stowed position to a deployed position, each of the first and second telescoping booms comprising a plurality of telescoping boom segments;

a plurality of deployable, steerable antennas, each deployable, steerable antenna carried by a respective telescoping boom segment and being movable between a stowed position and a deployed position;

each deployable, steerable antenna comprising an extendable support carried by a respective telescoping boom segment, an extendable hoop surrounding the extendable support, and at least one actuator coupled to the extendable support to mechanically steer the deployable, steerable antenna; and an antenna controller configured to steer the plurality of deployable, steerable antennas.

10. The deployable space antenna of claim 9, wherein each deployable, steerable antenna comprises:

a front cord arrangement coupled to the extendable hoop and defining a curved shape in a deployed position; and a reflective layer carried by the front cord arrangement.

11. The deployable space antenna of claim 10, wherein each deployable, steerable antenna comprises:

a rear cord arrangement behind the front cord arrangement and coupled between the extendable hoop and the extendable support; and a plurality of tie cords extending between the front cord arrangement and the rear cord arrangement.

12. The deployable space antenna of claim 10, wherein adjacent ones of the plurality of steerable, deployable antennas are arranged in a staggered relation defining overlapping antenna patterns.

13. A method for making a deployable space antenna comprising:

coupling a first telescoping boom and a second telescoping boom to be extendable from a housing in opposite directions from a stowed position to a deployed position, each of the first and second telescoping booms comprising a plurality of telescoping boom segments;

coupling each of a plurality of deployable, steerable antennas to a respective telescoping boom segment and being movable between a stowed position and a deployed position, each deployable, steerable antenna comprising an individually steerable reflector and a feed associated therewith; and coupling an antenna controller to steer the plurality of deployable, steerable antennas.

14. The method of claim 13, comprising at least one actuator configured to mechanically steer the deployable, steerable antenna.

15. The method of claim 13, wherein the feed comprises a phased array antenna feed configured to electronically steer the deployable, steerable antenna.

16. The method of claim 15, wherein the phased array antenna feed comprises a substrate and a plurality of antenna elements carried by the substrate.

17. The method of claim 13, wherein each deployable, steerable antenna comprises:

an extendable support carried by a respective telescoping boom segment; and an extendable hoop surrounding the extendable support.

18. The method of claim 17, wherein each deployable, steerable antenna comprises:

a front cord arrangement coupled to the extendable hoop and defining a curved shape in a deployed position; and a reflective layer carried by the front cord arrangement defining the individually steerable reflector.

19. The method of claim 18, wherein each deployable, steerable antenna comprises:

a rear cord arrangement behind the front cord arrangement and coupled between the extendable hoop and the extendable support; and a plurality of tie cords extending between the front cord arrangement and the rear cord arrangement.

20. The method of claim 13, comprising arranging adjacent ones of the plurality of steerable, deployable antennas in a staggered relation defining overlapping antenna patterns.

21. A deployable space antenna comprising:

a housing;

a first telescoping boom and a second telescoping boom extendable from the housing in opposite directions from a stowed position to a deployed position, each of the first and second telescoping booms comprising a plurality of telescoping boom segments;

a plurality of deployable, steerable antennas, each deployable, steerable antenna carried by a respective telescoping boom segment and being movable between a stowed position and a deployed position, adjacent ones of the plurality of steerable, deployable antennas being arranged in a staggered relation defining overlapping antenna patterns; and an antenna controller configured to steer the plurality of deployable, steerable antennas.

22. The deployable space antenna of claim 21, wherein each deployable, steerable antenna comprises a reflector and a feed associated therewith.

23. The deployable space antenna of claim 22, comprising at least one actuator configured to mechanically steer the deployable, steerable antenna.

24. The deployable space antenna of claim 22, wherein the feed comprises a phased array antenna feed configured to electronically steer the deployable, steerable antenna.

* * * * *